United States Patent [19]

Shannon

[11] Patent Number: 5,031,874
[45] Date of Patent: Jul. 16, 1991

[54] STICK-ON, PROTECTIVE MAGNET

[76] Inventor: Martin C. Shannon, 2311 Valleywood Dr., SE., Grand Rapids, Mich. 49546

[21] Appl. No.: 444,109

[22] Filed: Nov. 30, 1989

[51] Int. Cl.⁵ .............................................. A47F 5/00
[52] U.S. Cl. .................................. 248/683; 248/206.5
[58] Field of Search .................. 248/683, 205.3, 205.4, 248/206.5, 309.4; 211/DIG. 1; 206/818; 24/303; 224/273; 335/285; 220/85 CH, DIG. 33

[56]  References Cited

U.S. PATENT DOCUMENTS

| 2,527,482 | 10/1950 | Kinzler ............................... 248/206.5 |
| 2,702,683 | 2/1955 | Green et al. . |
| 2,717,096 | 9/1955 | Henderson . |
| 2,758,743 | 8/1956 | Smith . |
| 2,966,992 | 1/1961 | Dunkelberger .................. 248/309.4 |
| 2,977,082 | 3/1961 | Harris . |
| 3,008,754 | 11/1961 | Fiala . |
| 3,131,897 | 5/1964 | Shelker et al. . |
| 3,159,372 | 12/1964 | McIntosh . |
| 3,190,599 | 6/1965 | Margulis ............................ 248/205.3 |
| 3,195,022 | 7/1965 | Staver . |
| 3,261,126 | 7/1966 | Marks ................................ 248/205.3 |
| 3,365,684 | 1/1968 | Stemke et al. . |
| 3,713,614 | 1/1973 | Taylor . |
| 4,100,684 | 7/1978 | Berger . |
| 4,287,676 | 9/1981 | Weinhaus . |
| 4,605,292 | 8/1986 | McIntosh . |
| 4,653,711 | 3/1987 | Marshall . |
| 4,746,089 | 5/1988 | Clapper . |
| 4,811,765 | 3/1989 | Giha . |

FOREIGN PATENT DOCUMENTS 2400757 7/1975 Fed. Rep. of Germany .
2741968 12/1978 Fed. Rep. of Germany .

Primary Examiner—Ramon O. Ramirez
Assistant Examiner—Robert A. Olson
Attorney, Agent, or Firm—Price, Heneveld, Cooper, DeWitt & Litton

[57]  ABSTRACT

A device for magnetically attaching one item to a second item, which device has a scratch-resistant, static-resistant coating and a strip of thick, foam double-sided tape for permanent attachment of the device to one item.

3 Claims, 3 Drawing Sheets

STICK-ON, PROTECTIVE MAGNET

BACKGROUND OF THE INVENTION

The present invention relates generally to a device and method for magnetically attaching one object to another. One example of an application of the invention which encompasses the various problems that the invention addresses is the attachment of a fuel cap to machinery which is being refueled, during the refueling process.

When refueling a car, for example, it would be convenient to be able to magnetically adhere the gas fill tube cap to the vehicle This would also minimize the potential for the loss of the fuel cap. However, magnetic attachment can potentially scratch or mar the finish to which it is being attached.

Another problem involves affixing a magnet to an object which is to be magnetically adhered to another. It is difficult to adhere a flat magnet, for example, to an irregular or non-flat surface. The object to which the magnet is affixed might also have protuberances, such as a handle, above which the magnet might be required to project. Mounting the magnet directly upon such a handle might interfere with another portion of the total assembly, such as an access door.

SUMMARY OF THE INVENTION

The attachable magnet of the present invention is coated on its exposed magnetic adhering surface with a relatively soft plastic coating to minimize the likelihood of scratching a surface to which it is adhered. To facilitate adhering the magnet to an irregular or non-flat surface such as the rounded top of a gasoline fill cap, the magnet device of the present invention also includes a spongy piece of foam tape secured to the magnet and having an adhesive coated surface facing away from the magnet for adhering the magnet to a desired object. In an alternative embodiment, a positioning means is positioned between the relative to obstructions or the like on the object to which the device is attached.

These and other objects, advantages and features of the invention will be more fully understood and appreciated by reference to the written specification and appended drawings.

DESCRIPTION OF THE PREFERRED EMBODIMENT

Figure 1:
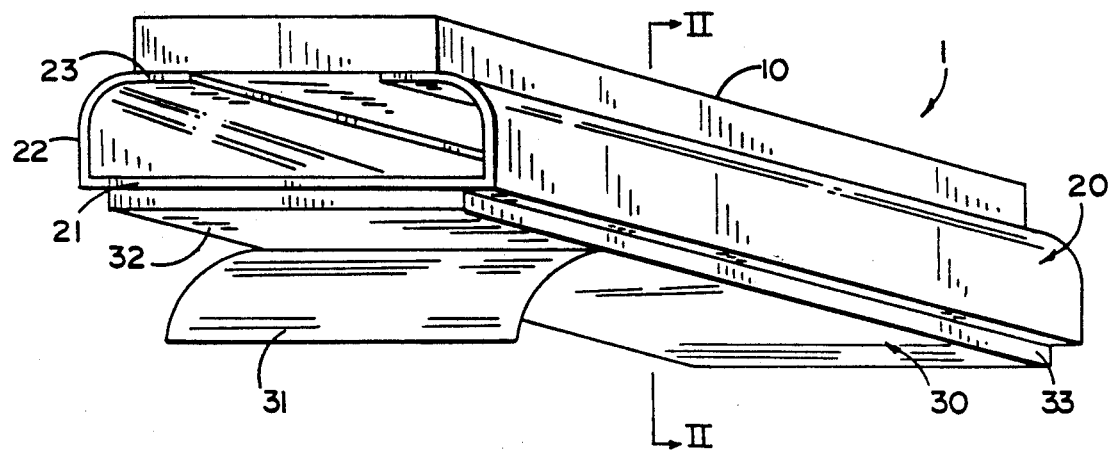
FIG. 1 is a perspective view showing a magnetic attaching device in accordance with the present invention.

In the preferred embodiment, magnetic device 1 of the present invention includes a bar magnet 10 adhered to a spacer 20, and a strip of double-faced, spongy foam tape 30 is adhered to the face of spacer 20 which is opposite magnet 10 (FIG. 1). The resulting assembly is covered, except for the exposed adhesive surface of tape 30, with a relatively soft plastic covering 40.

Magnet 10 is configured to meet a particular application. However, a rectangular, square, or ring-shaped magnet would be typical. Magnet 10 of the preferred embodiment is a permanent ceramic magnet which is of a general plate or bar configuration. Magnet 10 is sized primarily in accordance with the magnetic load capacity required for the specific application.

Figure 2:
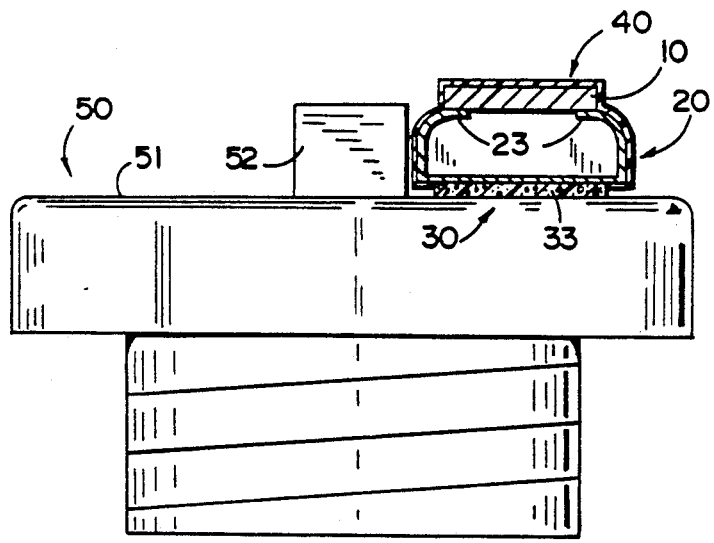
FIG. 2 is a cross section of the device of FIG. 1 taken along plane II—II of FIG. 1, with the device itself installed on a fuel cap, adjacent to the handle of the fuel cap.

Spacer 20 functions to properly position magnet 10 for a particular application. Spacer 20 is a generally C-shaped steel channel Spacer 20 is configured with a flat back 21, sidewalls 22 and flanges 23. In the preferred embodiment gas cap application, spacer 20 spaces magnet 10 above the surface 51 of gas cap 50 a sufficient distance that it projects above the level of handle 52 (FIG. 2)

Spacer 20 is preferably made of a magnetic material such as steel. Its proximity to magnet 10 enhances the magnetic capacity of magnet 10. Further in the first instance, magnet 10 is held in place on spacer 20 magnetically (a small drop of glue may also be used to assist). Its position on spacer 20 is then fixed when the entire assembly is coated with coating 40.

Tape 30 is a relatively thick, spongy, double-sided adhesive tape. Tape 30 is adhered to flat 21 of spacer 20 via the adhesive on one surface of tape 30. Face 32 of tape 30 is opposite to flat 21 of spacer 20. Face 32 is covered with an adhesive (not shown) which in turn is protected by a release liner 31. Release liner 31 is a piece of silicone coated paper. Said adhesive on face 32 and release liner 31 are such that release liner 31 may be cleanly removed from said adhesive, exposing said adhesive coated face 32 of tape 30. Further, said adhesive is such that when release liner 31 is removed from face 32 and face 32 is pressed against that surface to which device 1 is to be attached, device 1 is permanently adhered to said surface. Thick, spongy foam 33 is resilient and will conform to said surface, to which device 1 is attached.

Tape 30 should be sufficiently thick and spongy that it compensates for and conforms to an irregular or non-flat surface. A preferred thickness is approximately ⅛ to ⅜ inch. The adhesive on tape 30 should be such as to form a permanent bond when the tape is operatively adhered to magnet 10 and also to form a permanent bond between surface 32 and surface of the object, e.g., 51, to which device 1 is to be affixed when release liner 31 is removed from face 32 of tape 30 and device 1 is installed.

Plastic covering 40 is a relatively soft, plastic coating which preferably covers the entire assembly but does not adhere to release liner 31 of tape 30 (FIG. 2). Polyvinyl chloride affords an excellent, relatively soft plastic coating. Preferably, magnet 10, space 20 and tape 30, including release liner 31, are dipped into melted polyvinyl chloride to effect such coating. Upon removal, thin coating 40 of polyvinyl chloride has adhered to device 1 and cools to form a tough, but relatively soft covering thereon. The polyvinyl chloride will not adhere to the silicone coated release liner.

Coating 40 securely bonds the device together. Coating 40 prevents scratching or marring of a painted or plated surface when in contact with the device. Further, coating 40 suppresses static sparks between the device and the surface to which the device is being magnetically attached.

As shown in FIG. 2, magnetic device 1 is attached to top surface 51 of gas cap 50, adjacent handle 52. Spacer 20 is configured with sidewalls 22 such that in combination with the thickness of foam 33 and the thickness of magnet 10, magnet 10 projects slightly above handle 52 such that no portion of gas cap 50 contacts the vehicle surface to which magnet 10 is magnetically attached.

Figure 3:
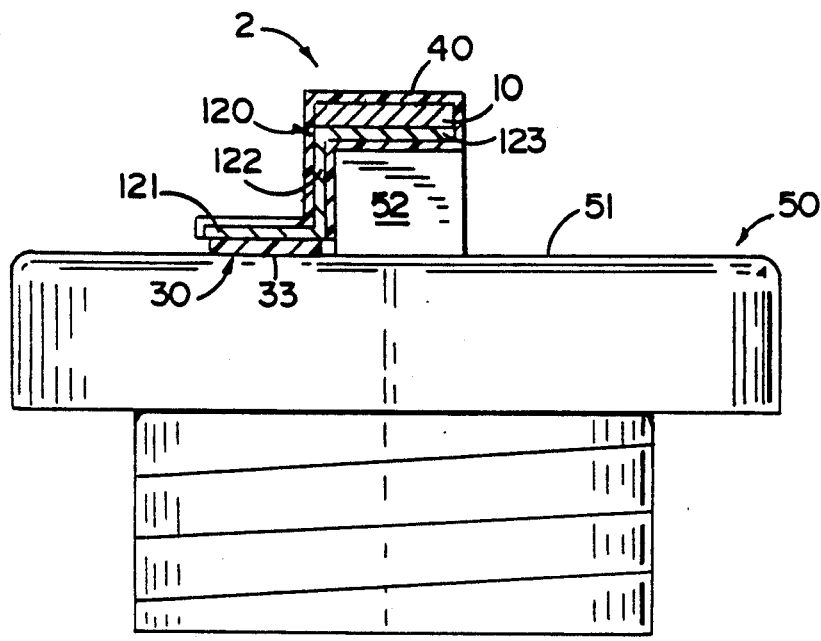
FIG. 3 shows a sectional through one alternative embodiment of the device as installed on a fuel cap.
Figure 4:
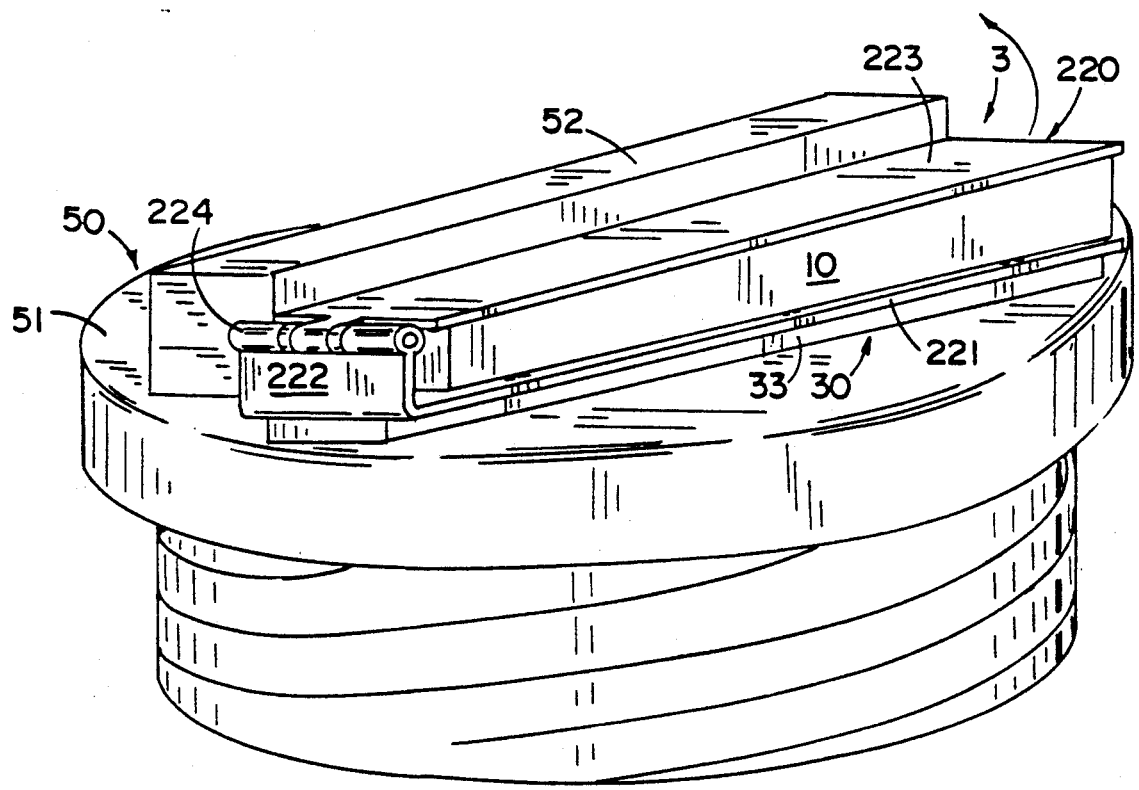
FIG. 4 is a perspective of another alternative embodiment of the invention which employs a hinging device to orient the magnet and which is shown installed on a gas cap in the closed position.

Two alternative embodiments 2 and 3 of the invention are had by replacing spacer 20 with spacer 120 (FIG. 3) and alternatively with spacer 220 (FIG. 4). Spacer 120 has a squared, Z-shaped configuration. Spacer 120 is comprised of upper and lower plate-shaped flanges 123 and 121, respectively, with a vertical, plate-shaped middle portion 122 connecting between upper flange 123 and lower flange 121.

Magnet 10, coating 40 and spongy foam tape 30 are as described above. Spacer 120 is also fabricated of steel, as is spacer 20.

Spacer 120 is configured and proportioned such that device 2 can be attached to top surface 51 of gas cap 50 and adjacent to handle 52 (FIG. 3), but with magnet 10 positioned immediately above handle 52 such that it could appear that magnet 10 was magnetically attached to handle 52.

Spacer 220 of alternative embodiment 3, incorporates a hinge 224 (FIG. 4). Spacer 220 is composed of a steel base plate 221 with a steel flange 222 and a steel top plate 223, which is joined to flange 222 by hinge 224. Magnet 10 is assembled to that face of top plate 223 which faces base plate 221 when top plate 223 is positioned parallel to base plate 221. Top plate 223 is attached to flange 221 by hinge 224 such that top plate 223 can pivotally rotate about hinge 224 through an arc of 270°, wherein top plate 223 is perpendicular to base plate 221 (FIG. 5).

Spongy tape 30 is attached to that face of base plate 221 which is opposite magnet 10 when magnet 10 is attached to top plate 223 and positioned parallel to base plate 221, in the closed position.

As shown in FIG. 4, third alternative preferred embodiment 3 is also attached to top 51 of gas cap 50, adjacent to handle 52, by removing release liner (not shown) and pressing the exposed, adhesive-coated surface of tape 30 against gas cap top 51 FIG. 4 shows third alternative preferred embodiment 3 in its closed position. In this position, handle 52 projects above the level of magnet 10 and interferes with its adherence to another surface.

Figure 5:
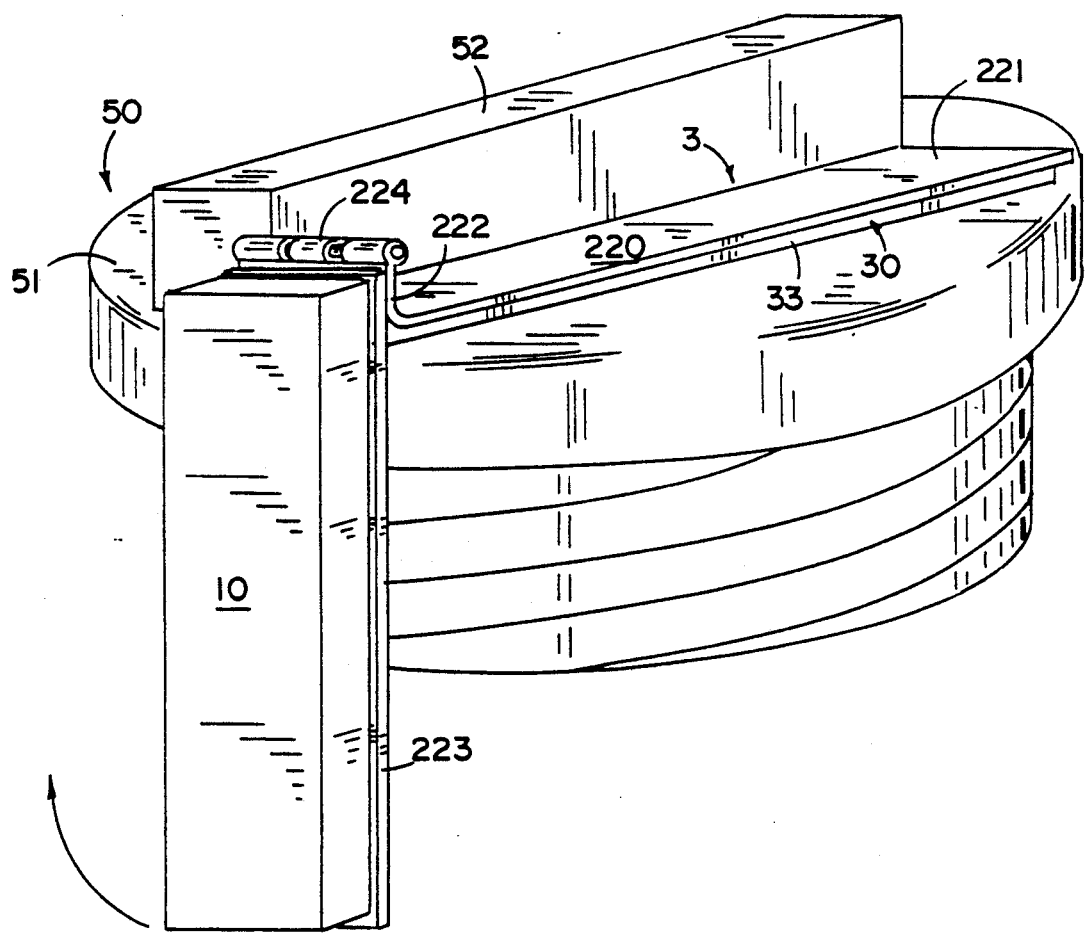
FIG. 5 is the same view as FIG. 4 but showing the hinged device in its open position.

As above suggested, magnet 10 with top plate 220 can be pivotally rotated 270° about hinge 224 until magnet 10 with top plate 223 is positioned alongside gas cap 50 and perpendicular to base plate 220 in the open position (FIG. 5). This rotates magnet 10 into an unobstructed position such that it and gas cap 50 to which it is attached can be magnetically adhered to a surface such as an automobile quarter panel.

Of course, it is understood that the above is merely a preferred embodiment of the invention and that various changes and alterations can be made without departing from the spirit and broader aspects thereof.

The embodiments of the invention in which an exclusive property or privilege is claimed are defined as follows.

1. A magnetic securing device comprising:
   a positioning means including a pair of laterally offset, generally parallel flanges, and a web portion extending between said flanges in a generally Z-shaped configuration;
   a permanent magnet secured to said positioning means and defining a magnetic adhering surface for magnetically adhering said device to another surface;
   adhering means secured to one of said flanges of said positioning means at a location other than said magnet whereby said adhering means defines an exposed adhesive surface which will function to adhere said device to an object; and
   a soft, protective coating means at least covering said magnetic adhering surface and not covering said exposed adhesive surface.

2. The magnetic device of claim 1 in which:
   said adhering means comprises a double-sided, relatively thick, spongy foam tape of approximately ⅛ to ⅜ inch thickness having a first adhesive coated surface engaging said one of said pair of sides and a second adhesive coated surface opposite said first surface and defining said exposed adhesive surface, said exposed adhesive surface being covered and thereby protected by a removable silicone coated protective cover which can be cleanly removed from said adhesive coated second side, exposing said adhesive coated second side.

3. The magnetic device of claim 2 in which: said soft protective coating comprises polyvinyl chloride.

* * * * *

UNITED STATES PATENT AND TRADEMARK OFFICE
CERTIFICATE OF CORRECTION

PATENT NO.  : 5,031,874
DATED       : July 16, 1991
INVENTOR(S) : Martin C. Shannon It is certified that error appears in the above-identified patent and that said Letters Patent is hereby corrected as shown below:

```
Column 1, line 14:
    After "vehicle" insert --.--.

Column 1, line 40:
    After "between the" insert --magnet
    and an adhesive surface to position
    the magnet--.

Column 1, line 46:
    Before "DESCRIPTION" insert
    --BRIEF--.

Column 2, line 14:
    After "channel" insert --.--.

Column 3, line 47:
    After "51" insert --.--.
```

Signed and Sealed this

Twelfth Day of January, 1993

*Attest:*

DOUGLAS B. COMER

*Attesting Officer*    Acting Commissioner of Patents and Trademarks